US012043477B1

(12) United States Patent
Barber et al.

(10) Patent No.: US 12,043,477 B1
(45) Date of Patent: Jul. 23, 2024

(54) PERSONAL PRODUCT DISPOSAL BAG AND METHOD OF USE

(71) Applicants: Bernadette Ballesteros Barber, San Antonio, TX (US); Don Randall Barber, II, San Antonio, TX (US)

(72) Inventors: Bernadette Ballesteros Barber, San Antonio, TX (US); Don Randall Barber, II, San Antonio, TX (US)

( * ) Notice: Subject to any disclaimer, the term of this patent is extended or adjusted under 35 U.S.C. 154(b) by 0 days.

(21) Appl. No.: 17/473,759

(22) Filed: Sep. 13, 2021

Related U.S. Application Data

(63) Continuation-in-part of application No. 16/549,775, filed on Aug. 23, 2019, now abandoned.

(51) Int. Cl.

| | |
|---|---|
| ***B65D 33/18*** | (2006.01) |
| ***B65F 1/00*** | (2006.01) |
| ***B65F 1/02*** | (2006.01) |

(52) U.S. Cl.
CPC .............. *B65F 1/0026* (2013.01); *B65F 1/02* (2013.01); *B65D 33/18* (2013.01); *B65F 2240/164* (2013.01)

(58) Field of Classification Search
CPC ........ B65F 1/006; B65F 1/002; B65F 1/0026; B65F 2240/164; B65D 33/16; B65D 33/18; B65D 33/20
See application file for complete search history.

(56) References Cited

U.S. PATENT DOCUMENTS

| | | | |
|---|---|---|---|
| 3,272,248 | A | 9/1966 | O'farrell |
| D265,020 | S | 6/1982 | Silton |
| 4,786,190 | A | 11/1988 | Erden et al. |
| 6,059,100 | A | 5/2000 | Jones |
| D426,057 | S | 6/2000 | Velazquez |
| 6,102,457 | A | 8/2000 | Smith |
| D494,359 | S | 8/2004 | Eldon, III et al. |
| D494,852 | S | 8/2004 | Meador et al. |
| D508,316 | S | 8/2005 | Tsai |
| D529,710 | S | 10/2006 | Wilson et al. |
| D544,705 | S | 6/2007 | Zawacki |
| D545,215 | S | 6/2007 | Germanow et al. |
| D546,553 | S | 7/2007 | Carroll |
| 7,422,106 | B1 | 9/2008 | Kendra |

(Continued)

OTHER PUBLICATIONS

U.S. Appl. No. 17/473,759, filed Oct. 10, 2023_BR_PI1101742_A2_M (Year: 2012).*

*Primary Examiner* — Jes F Pascua
*Assistant Examiner* — Nina K Attel
(74) *Attorney, Agent, or Firm* — Avek IP, LLC

(57) ABSTRACT

A method of disposing of a personal product includes providing a personal product disposal bag having a body with a water proof interior layer and an exterior layer composed of a material having an appearance of paper, the personal product disposal bag further having a flap extending from the body and to fold over an opening into the body to thereby seal off the body; inserting a personal product into the personal product disposal bag through the opening; sealing the flap closed via an adhesive such that the personal product is secured within the body; and placing the personal product disposal bag with the personal product into a trash bin; the personal product disposal bag prevents odor from escaping and visibly conceals the personal product by providing the appearance of paper.

6 Claims, 6 Drawing Sheets

(56) References Cited

U.S. PATENT DOCUMENTS

| | | | |
|---|---|---|---|
| D589,702 | S | 4/2009 | Hale |
| D596,841 | S | 7/2009 | Rein et al. |
| D601,799 | S | 10/2009 | Andre et al. |
| D648,520 | S | 11/2011 | Fahrendorff et al. |
| D651,790 | S | 1/2012 | Groves |
| D657,547 | S | 4/2012 | Koppel et al. |
| D659,381 | S | 5/2012 | Fahrendorff et al. |
| D663,120 | S | 7/2012 | Dow et al. |
| D666,417 | S | 9/2012 | Phillips et al. |
| D666,821 | S | 9/2012 | Phillips et al. |
| D672,148 | S | 12/2012 | Phillips et al. |
| D675,441 | S | 2/2013 | Phillips et al. |
| 8,403,903 | B2 | 3/2013 | Clark, Jr. et al. |
| D679,499 | S | 4/2013 | Harris |
| D679,500 | S | 4/2013 | Phillips et al. |
| D682,551 | S | 5/2013 | Phillips et al. |
| D685,579 | S | 7/2013 | Phillips et al. |
| D691,368 | S | 10/2013 | Curran-Blaney et al. |
| D696,864 | S | 1/2014 | Phillips et al. |
| D704,443 | S | 5/2014 | Curran-Blaney et al. |
| D712,146 | S | 9/2014 | Curran-Blaney et al. |
| D712,147 | S | 9/2014 | Curran-Blaney et al. |
| D712,659 | S | 9/2014 | Hays et al. |
| D713,145 | S | 9/2014 | Fathollahi |
| D723,271 | S | 3/2015 | Basha |
| D730,052 | S | 5/2015 | Curran-Blaney et al. |
| D741,195 | S | 10/2015 | Nickla |
| D771,369 | S | 11/2016 | Willows et al. |
| D790,722 | S | 6/2017 | Tyler |
| D797,443 | S | 9/2017 | Holmes |
| D806,558 | S | 1/2018 | Jones |
| D809,780 | S | 2/2018 | Simms et al. |
| D817,184 | S | 5/2018 | Frinks |
| D823,594 | S | 7/2018 | Newman |
| D829,022 | S | 9/2018 | McAfee |
| D851,912 | S | 6/2019 | Kim et al. |
| D880,159 | S | 4/2020 | Fenton et al. |
| D908,346 | S | 1/2021 | Blanchette |
| D937,565 | S | 12/2021 | Blanchette |
| D947,679 | S | 4/2022 | Hughes et al. |
| D947,680 | S | 4/2022 | Hsu |
| D949,966 | S | 4/2022 | Yan |
| D954,036 | S | 6/2022 | Akana et al. |
| D957,257 | S | 7/2022 | Zhu et al. |
| D957,258 | S | 7/2022 | Yang |
| D957,259 | S | 7/2022 | Yang |
| D958,669 | S | 7/2022 | Germanow |
| D962,781 | S | 9/2022 | Li |
| 2005/0098466 | A1 | 5/2005 | Thomas |
| 2006/0106357 | A1 | 5/2006 | McLean |
| 2008/0212903 | A1 | 9/2008 | Germanow et al. |
| 2011/0229059 | A1 | 9/2011 | Hanna et al. |
| 2011/0268373 | A1 | 11/2011 | Polland |
| 2012/0053549 | A1 | 3/2012 | Knight |
| 2012/0294551 | A1 | 11/2012 | Ford |
| 2012/0301057 | A1 | 11/2012 | Conant et al. |
| 2013/0043144 | A1 | 2/2013 | McDonald et al. |
| 2013/0110062 | A1 | 5/2013 | Glenn |
| 2016/0101000 | A1 | 4/2016 | Lopez |

* cited by examiner

PERSONAL PRODUCT DISPOSAL BAG AND METHOD OF USE

BACKGROUND

1. Field of the Invention

The present invention relates generally to personal product disposal systems, and more specifically, to a personal product disposable bag that provides for a sealable bag, with an exterior composed of a paper like material, to therefore camouflage the disposable bag when placed in a trash container.

2. Description of Related Art

Personal product disposal systems are well known in the art and are effective means to dispose of personal items, such as feminine products and condoms. For example, FIG. 1 depicts a flowchart 101 of a conventional disposal method, wherein the user uses a personal product, and places the product in a garbage container, as shown with boxes 103, 105. The product may therefore be visible and unsightly, and can further emit an unpleasant odor, as shown with box 107.

One of the problems commonly associated with method 101 is the disposal, which may lead to embarrassment for the user.

Accordingly, although great strides have been made in the area of personal product disposal systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
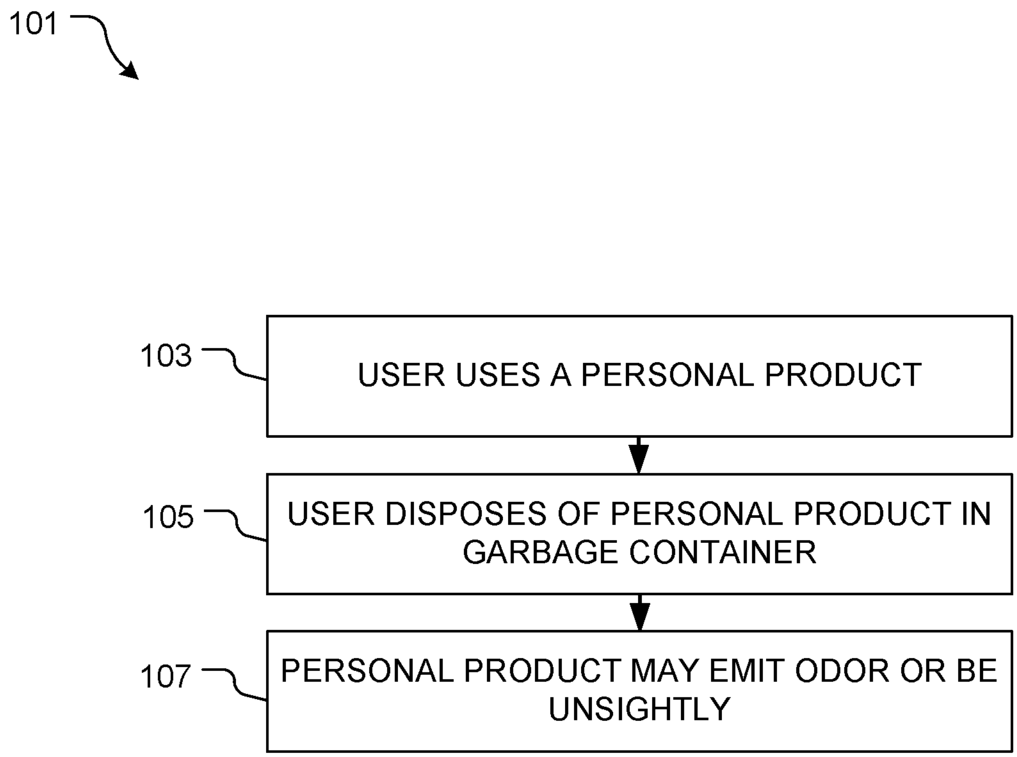
FIG. 1 (Prior Art)
FIG. 1 is a flowchart of a common method of personal product disposal.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional personal product disposal systems. Specifically, the present invention provides for a discrete means to dispose of the product, be it a tampon, feminine pad, condom, or the like. In addition, the system of the present invention provides for an odor blocking seal to further provide for discrete disposal. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
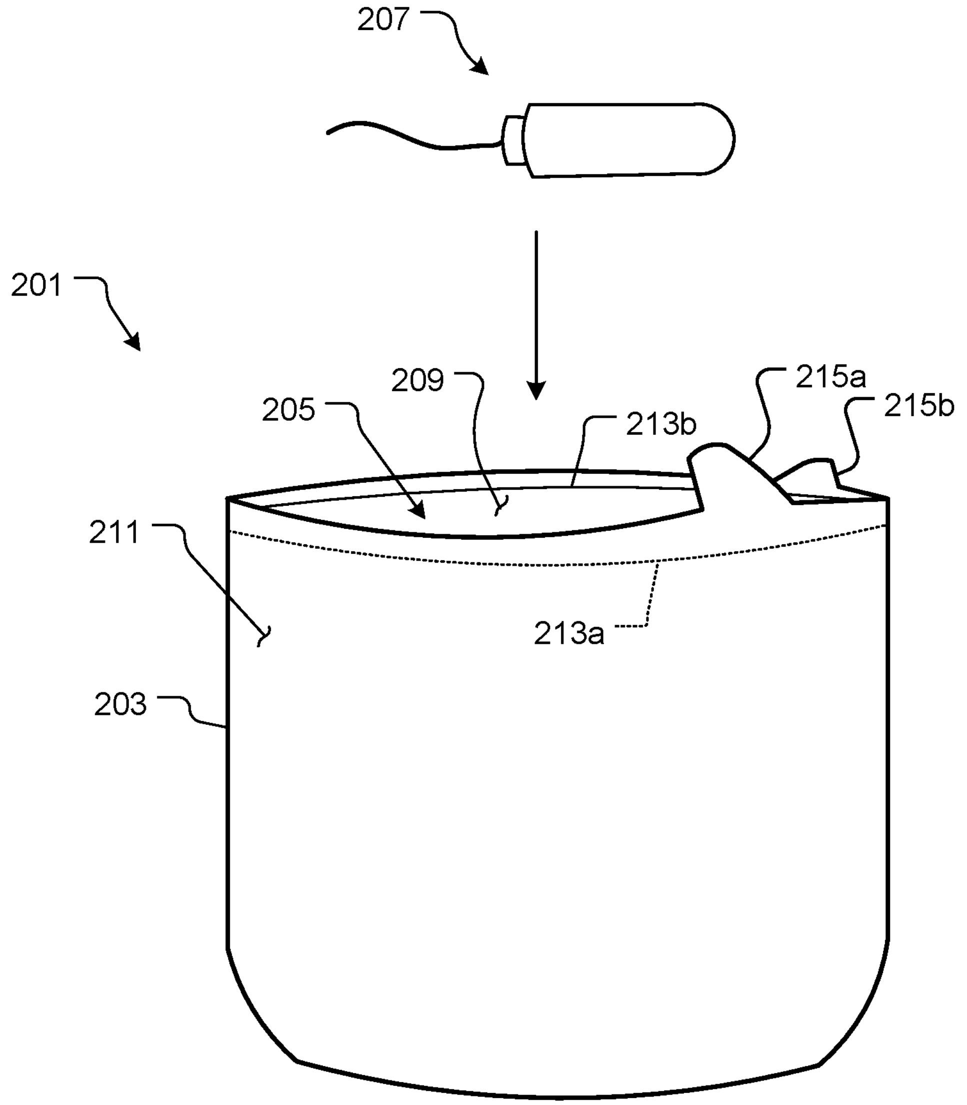
FIG. 2 is a front view of a personal product disposal bag in accordance with a preferred embodiment of the present application.

Referring now to the drawings wherein like reference characters identify corresponding or similar elements throughout the several views, FIG. 2 depicts a front view of a personal product disposal bag 201 in accordance with a preferred embodiment of the present application. It will be appreciated that bag 201 overcomes one or more of the above-listed problems commonly associated with conventional personal product disposal systems.

In the contemplated embodiment, bag 201 includes a body 203 with two sides forming an interior pouch 205, wherein the pouch 205 is configured to receive a personal product 207 therein. Although product 207 is shown as a feminine product, it should be appreciated that the bag 201 can vary in size to accommodate various products discussed herein.

Body 203 further includes an interior layer 209 composed of a water-resistant material, such as a plastic, thereby preventing any leakage of a liquid or odor from pouch 205. Further, body 203 includes an exterior layer 211 that can be composed of a paper type material, such as a toilet paper, or a material that mimics toilet paper, or in alternative embodiments can be a plastic exterior, the plastic exterior likely having a camouflage print thereon that mimics paper. It should be appreciated that this is one of the unique features of the present invention. The exterior layer provides for a camouflage appearance as the bag is placed in a garbage container, thereby ensuring that the user can discretely dispose of their personal product without fear of embarrassment.

In the preferred embodiment, a sealable opening 213*a-b* is configured to provide a means to seal pouch 205, thereby locking product 207 inside, along with any moisture and odor. It is contemplated that the sealable opening can include a re-sealable zipper, an adhesive, or any other appropriate device to seal the pouch closed.

In some embodiments, bag 201 further includes one or more tabs 215*a-b* to allow for easy opening of the body.

Figure 3:
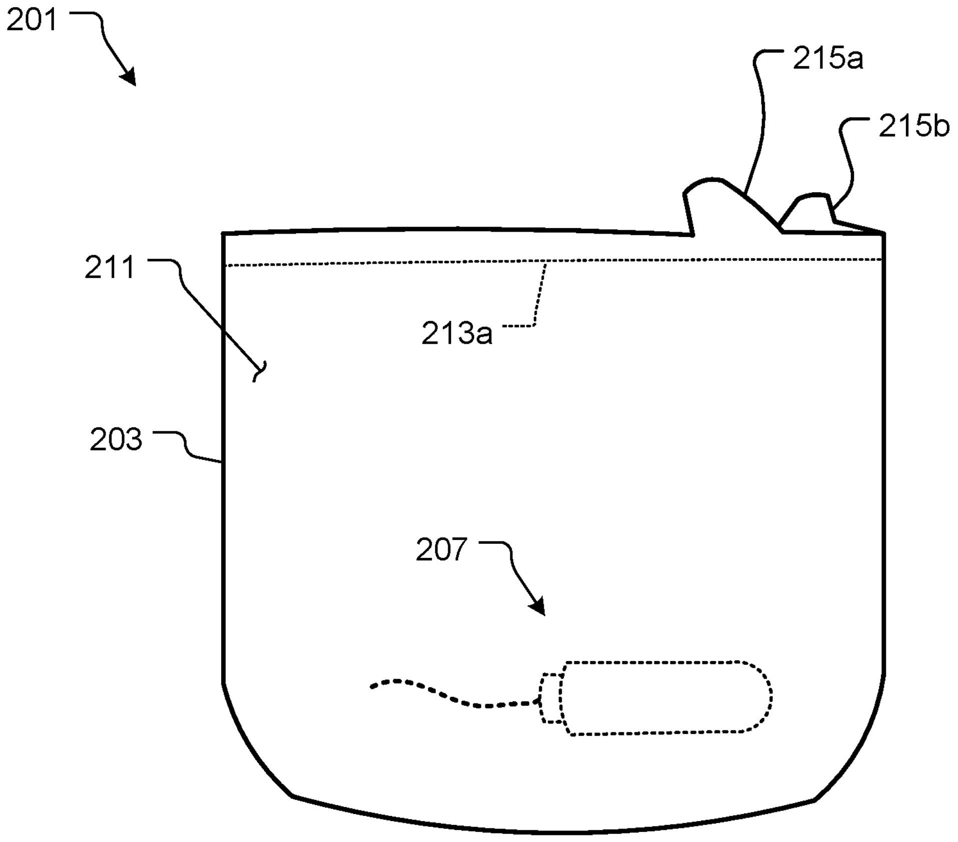
FIG. 3 is a front view of the bag of FIG. 2 in a sealed configuration.

In FIG. 3, a front view of bag 201 is shown in a closed configuration for clarity, wherein the product 207 is sealed inside the pouch and camouflaged from the exterior.

Figure 4:
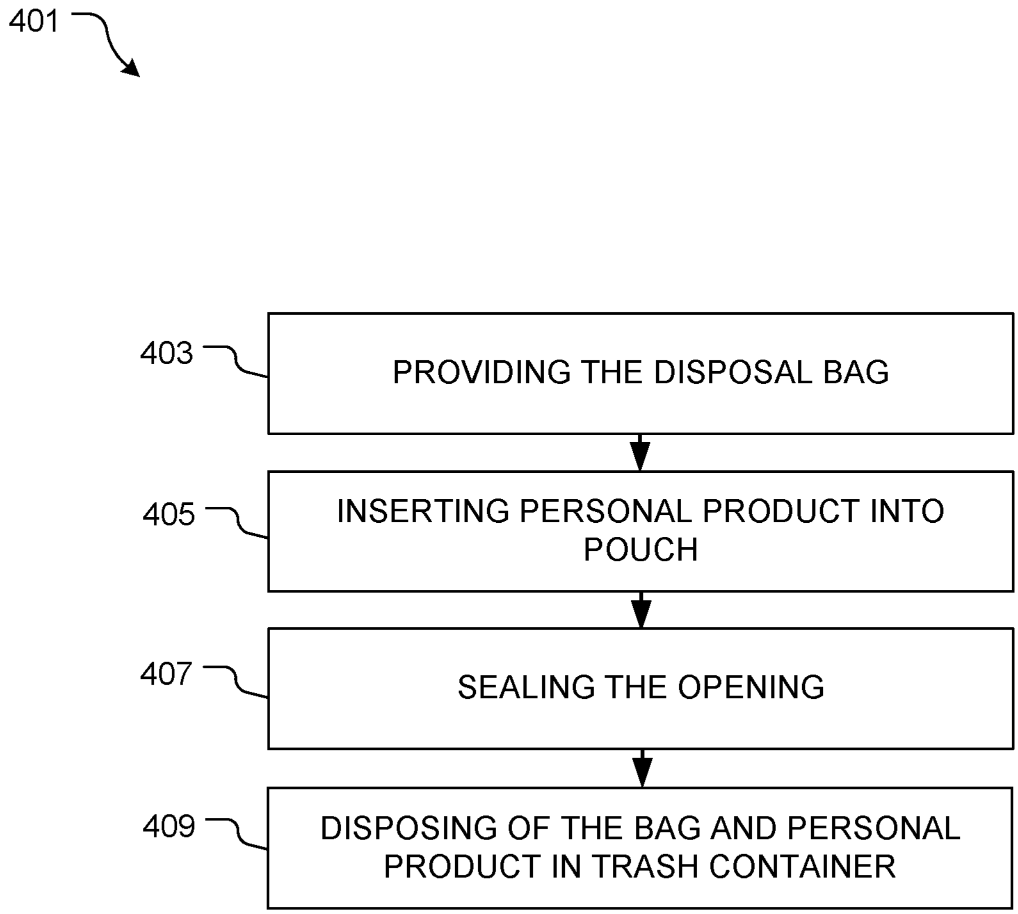
FIG. 4 is a flowchart of the method of use of the bag of FIG. 2.

In FIG. 4, a flowchart 401 depicts the method of use of bag 201. During use, the user is provided with the disposable bag to place their used personal product inside, as shown with boxes 403, 405. The user then seals the opening and places the bag and product inside the trash container, as shown with boxes 407, 409. The bag prevents odor and moisture from escaping, while camouflaging the personal product, thereby providing the user with discrete disposal.

Figure 5:
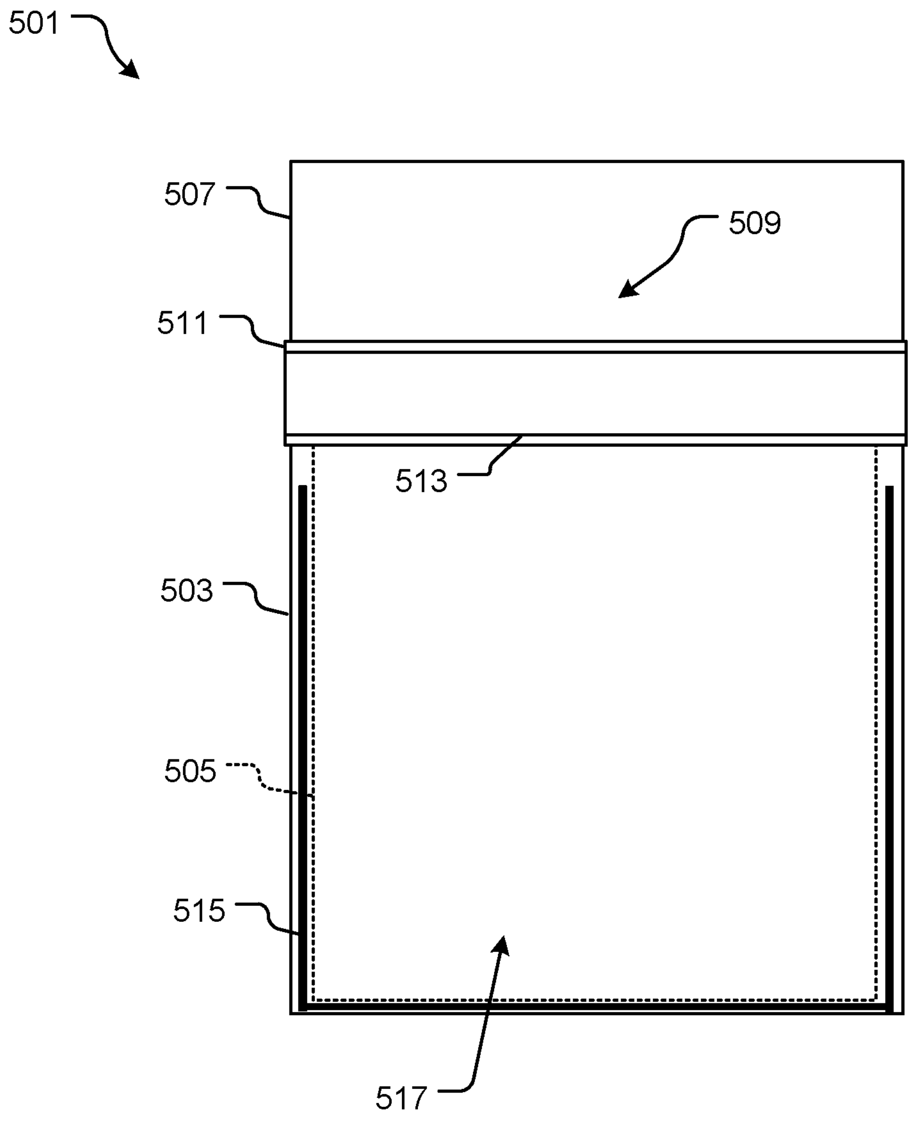
FIG. 5 is a front view of an alternative embodiment of a personal product disposal bag in accordance with the present application.

In FIG. 5, a front view of an alternative embodiment of a bag 501 is shown, having a body 503 with a water proof interior layer 505. In this embodiment, a top flap 507 is configured to fold over the top opening 509 to secure to an adhesive 511 that has a removable cover 513. It should further be appreciated that it is contemplated to include a rigid insert 515 that provides for opening of the bag when the user applies pressure. It should be appreciated that the features of the various embodiments can be interchanged. The exterior surface 517 includes a textured pattern that mimics paper towel or toilet paper in aesthetics.

Figure 6:
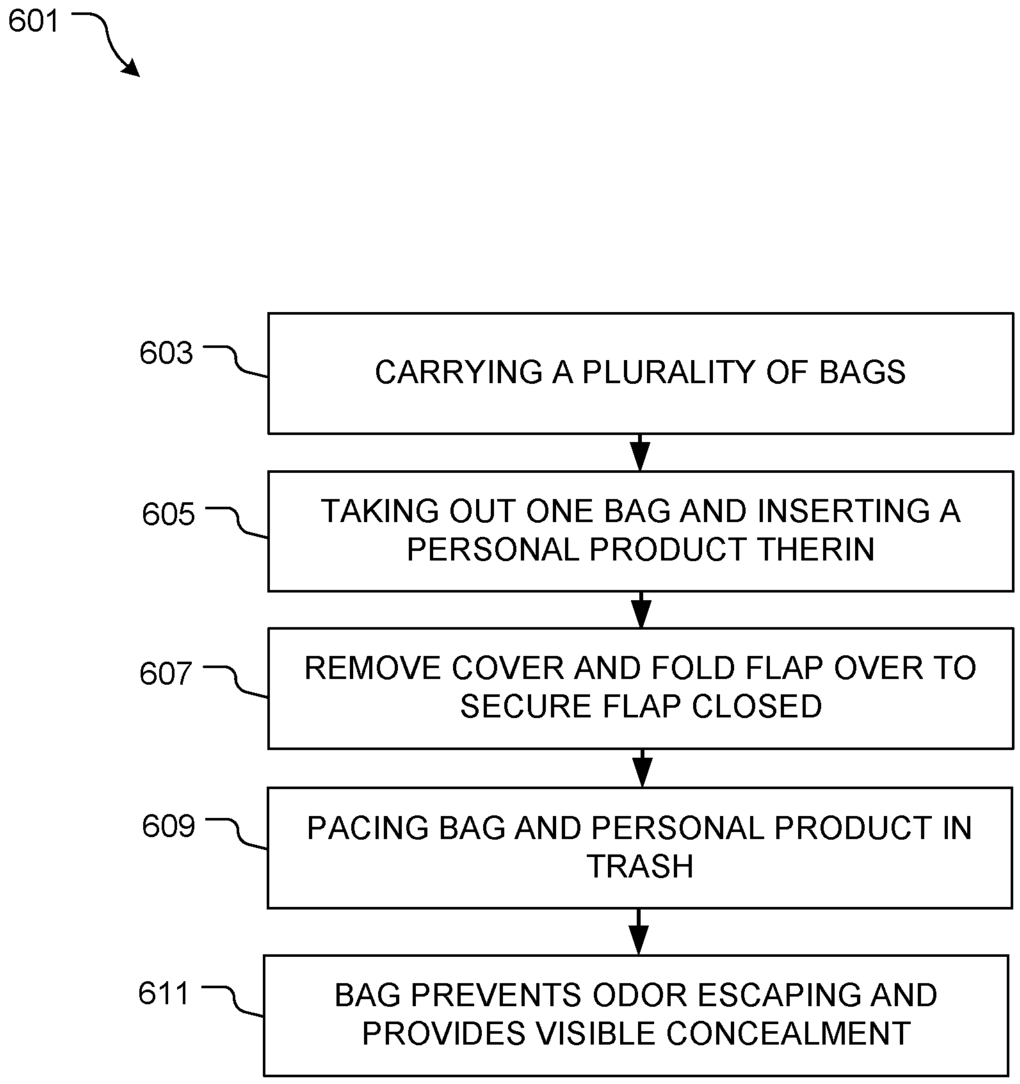
FIG. 6 is a flowchart of a method of use of the bag of FIG. 5.

In FIG. 6, another flowchart 601 depicts the method of use of bag 501. During use, the user may carry a plurality of bags 501, such as in their purse or handbag, as shown with box 603. As needed, the user may take out one bag and place a personal product, such as a tampon, inside of the bag, as shown with box 605. The user will then remove the cover from the adhesive and fold over the top flap to seal the bag, as shown with box 607. The user will then place the bag and the personal product within the trash such that the only visible sign of the bag is the exterior surface, which is composed of a paper or similar material to mimic toilet paper or paper towels, as shown with box 609. The bag then remains in the trash, while concealing any odor, and being concealed in visibility, as shown with box 611.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of disposing of a personal product, the method comprising:

providing a personal product disposal bag having a body with a waterproof interior layer and an exterior layer composed of a material having a textured pattern that mimics one of toilet paper or paper towels, the personal product disposal bag further having a flap extending from the body and configured to fold over an opening into the body to thereby seal off the body;

inserting the personal product into the personal product disposal bag through the opening;

sealing the flap closed via an adhesive such that the personal product is secured within the body and an only visible portion of the personal product disposal bag is the textured pattern that mimics one of toilet paper or paper towels; and placing the personal product disposal bag with the personal product into a trash bin;

wherein the personal product disposal bag prevents odor from escaping and visibly conceals the personal product due to the textured pattern.

2. The method of claim 1, wherein the personal product disposal bag further comprises includes an insert configured to open the personal product disposal bag upon pressure.

3. The method of claim 1, wherein the personal product is a feminine hygiene product.

4. The method of claim 1, wherein the exterior layer is composed of paper.

5. The method of claim 1, wherein the exterior layer is white.

6. A method of disposing of a personal product, the method consisting of:

providing a personal product disposal bag consisting of a body with a waterproof interior layer, an exterior layer composed of a material having a textured pattern that mimics paper, and a flap extending from the body and configured to fold over an opening into the body to thereby seal off the body;

inserting the personal product into the personal product disposal bag through the opening;

sealing the flap closed such that the personal product is secured within the body and an only visible portion of the personal product disposal bag is the textured pattern that mimics paper; and placing the personal product disposal bag with the personal product into a trash bin;

wherein the personal product disposal bag prevents odor from escaping and visibly conceals the personal product due to the textured pattern.

* * * * *